(12) United States Patent
Kim (10) Patent No.: US 11,585,481 B2
(45) Date of Patent: Feb. 21, 2023

(54) WALL MOUNT TYPE DISPLAY DEVICE

(71) Applicant: LG ELECTRONICS INC., Seoul (KR)

(72) Inventor: Chanwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 17/023,282

(22) Filed: Sep. 16, 2020

(65) Prior Publication Data

US 2022/0026950 A1     Jan. 27, 2022

(30) Foreign Application Priority Data

Jul. 24, 2020    (KR) ........................ 10-2020-0092467

(51) Int. Cl.
*F16M 11/04*      (2006.01)
*F16M 11/08*      (2006.01)
*F16M 13/02*      (2006.01)

(52) U.S. Cl.
CPC ........... *F16M 11/046* (2013.01); *F16M 11/08* (2013.01); *F16M 13/022* (2013.01)

(58) Field of Classification Search
CPC combination set(s) only.
See application file for complete search history.

(56) References Cited

U.S. PATENT DOCUMENTS

| 5,931,439 | A | * | 8/1999 | Lemire | ..................... | A47G 1/18 248/495 |
| 5,947,438 | A | | 9/1999 | Lemire | | |
| 6,062,525 | A | * | 5/2000 | Lemire | .................. | A47G 1/164 248/495 |
| 9,010,707 | B2 | * | 4/2015 | In | ........................... | A47G 1/164 248/295.11 |

(Continued)

FOREIGN PATENT DOCUMENTS

| CN | 201561250 | 8/2010 |
| EP | 2336627 | 6/2011 |

(Continued)

OTHER PUBLICATIONS

European Patent Office Application Serial No. 20195833.7, Search Report dated Mar. 3, 2021, 5 pages.

*Primary Examiner* — Monica E Millner
(74) *Attorney, Agent, or Firm* — Lee Hong Degerman Kang Waimey (57) ABSTRACT

A wall mount type display device according to an embodiment of the present disclosure may include a main body on which a display is provided, a wire having opposite ends connected to the main body, and a wall mount assembly which is fixed to a wall and to which the wire is hung to support the main body. The wall mount assembly may include a pair of supporting bars which support the wire and extend in a direction closer to each other toward the upper side, a first link rotatably connecting upper end portions of the pair of supporting bars to each other, a long hole formed (Continued)

through the supporting bar and extending in a longitudinal direction of the supporting bar, a second link located at a height lower than the first link, a protrusion protruding from opposite ends of the second link and inserted into the long hole, and a fixing member fixed to the wall through the protrusion.

13 Claims, 5 Drawing Sheets

(56) References Cited

U.S. PATENT DOCUMENTS

| | | | |
|---|---|---|---|
| 9,107,520 B1 * | 8/2015 | Davies | A47G 1/1606 |
| 9,386,711 B2 | 7/2016 | Kim | |
| 9,839,148 B2 | 12/2017 | Kim | |
| 2005/0139747 A1 * | 6/2005 | Lemire | A47G 1/18 |
| | | | 248/493 |
| 2006/0250347 A1 * | 11/2006 | Bertoncini | G06F 1/1601 |
| | | | 345/103 |
| 2006/0278799 A1 | 12/2006 | Newman | |
| 2009/0278008 A1 * | 11/2009 | Park | A47G 1/24 |
| | | | 248/302 |
| 2009/0278018 A1 * | 11/2009 | Park | F16M 13/02 |
| | | | 248/329 |
| 2011/0147557 A1 | 6/2011 | In et al. | |
| 2012/0175480 A1 * | 7/2012 | Lee | F16M 11/18 |
| | | | 248/295.11 |
| 2013/0270407 A1 | 10/2013 | Oh | |
| 2014/0016292 A1 | 1/2014 | Kim | |
| 2014/0183325 A1 * | 7/2014 | Azad | A47G 1/164 |
| | | | 248/493 |
| 2016/0295717 A1 | 10/2016 | Kim | |
| 2016/0316942 A1 * | 11/2016 | Greve | A47G 1/164 |

FOREIGN PATENT DOCUMENTS

| | | |
|---|---|---|
| KR | 20100007683 | 1/2010 |
| KR | 20140009633 | 1/2014 |

* cited by examiner

WALL MOUNT TYPE DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0092467, filed on Jul. 24, 2020, the contents of which are all hereby incorporated by reference herein in its entirety.

BACKGROUND

The present disclosure relates to a wall mount type display device.

Display devices include a liquid crystal display (LCD), a field emission display (FED), a plasma display panel (PDP), and an electroluminescence device.

As an example of the electroluminescence device, an active matrix-type organic light-emitting display device using an organic light-emitting diode (OLED) is commercially available. Since the organic light-emitting display device is a self-luminous element, the organic light-emitting display device has no backlight compared to a liquid crystal display device, and has advantages in response speed, viewing angle, and the like and thus is attracting attention as a next-generation display.

Meanwhile, the display device may be divided into a stand type display device and a wall mount type display device according to an installation method.

In particular, the wall mount type display device has advantages in that the wall mount type display device is easy to adjust the installation height, does not require a stand, and has a beautiful design because the installation bracket for the wall is not visible from the front.

However, the conventional wall mount type display device has a problem in that the configuration of the installation bracket is complicated and the installation method thereof is complicated.

PRIOR ART

Patent Document

KR 10-2014-0009633A (Wall mount type display device, published on Jan. 23, 2014)

SUMMARY

The problem to be solved by the present disclosure is to provide a wall mount type display device that is easily installed and stably supported.

A wall mount type display device according to an embodiment of the present disclosure may include a main body on which a display is provided, a wire having opposite ends connected to the main body, and a wall mount assembly which is fixed to a wall and to which the wire is hung to support the main body.

The wall mount assembly may include a pair of supporting bars which support the wire and extend in a direction closer to each other toward the upper side, a first link rotatably connecting upper end portions of the pair of supporting bars to each other, a long hole formed through the supporting bar and extending in a longitudinal direction of the supporting bar, a second link located at a height lower than the first link, a protrusion protruding from opposite ends of the second link and inserted into the long hole, and a fixing member fixed to the wall through the protrusion.

The pair of supporting bars may slide with respect to the protrusion along the long hole and have a variable inclination.

An inclination of the supporting bar may be varied between a first inclination in which the upper end portion of the supporting bar protrudes upward of the main body and a second inclination in which the upper end portion of the supporting bar is located at a rear of the main body.

When the inclination of the pair of supporting bars is the first inclination, the first link may be spaced above the second link, and when the inclination of the pair of supporting bars is the second inclination, the first link may be adjacent to or in contact with the second link.

The wall mount type display device may further include a latch which is connected to any one of the first link and the second link, and a latch hole which is formed on the other one of the first link and the second link, and into which the latch is fitted when the inclination of the pair of supporting bars is in the second inclination.

On a circumferential surface of the supporting bar, a wire receiving groove in which the wire is received and which extends along the circumferential surface of the supporting bar may be formed.

The wall mount type display device may further include a pair of washers located between a head portion of the pair of fixing members and the pair of protrusions. A stepped recess in which the washer is located may be formed on a front surface of the pair of supporting bars, and the long hole may be formed through an inside of the stepped recess.

A connection hole through which opposite end portions of the first link are rotatably connected may be formed on an upper end portion of the pair of supporting bars.

The first link may include a rear plate located a rear of the pair of supporting bars, an insertion portions protruding forward from opposite end portions of the rear plate and inserted into the connection holes, and a front cover located in front of the pair of supporting bars and fastened to the insertion portion.

A stepped portion which is stepped with respect to an outer surface and on which the front cover or the rear plate is seated may be formed on the pair of supporting bars.

The first link may further include a reinforcing body located between the upper end portions of the pair of supporting bars and located between the rear plate and the front cover.

The wall mount type display device may further include a pair of wire connection portions which are fixed to a rear surface of the main body and on which a wire groove around which the wire is wound is formed around an outer circumference thereof.

A vertical distance between an upper end of the main body and the wire connection portion may be greater than a vertical distance between an upper end of the main body and the second link.

A distance between the pair of wire connection portions may be longer than a length of the second link.

DETAILED DESCRIPTION OF THE EMBODIMENTS

Hereinafter, specific embodiments of the present disclosure will be described in detail together with the drawings.

Hereinafter, it may mean that if one element is described as being "fastened" or "connected" to another element, the two elements are directly fastened or connected, or a third element exists between the two elements, and it may mean that the two elements are connected or fastened to each other by the third element. On the other hand, it may be understood that if one element is described as being "directly fastened" or "directly connected" to another element, there is no third element between the two elements.

Figure 1:
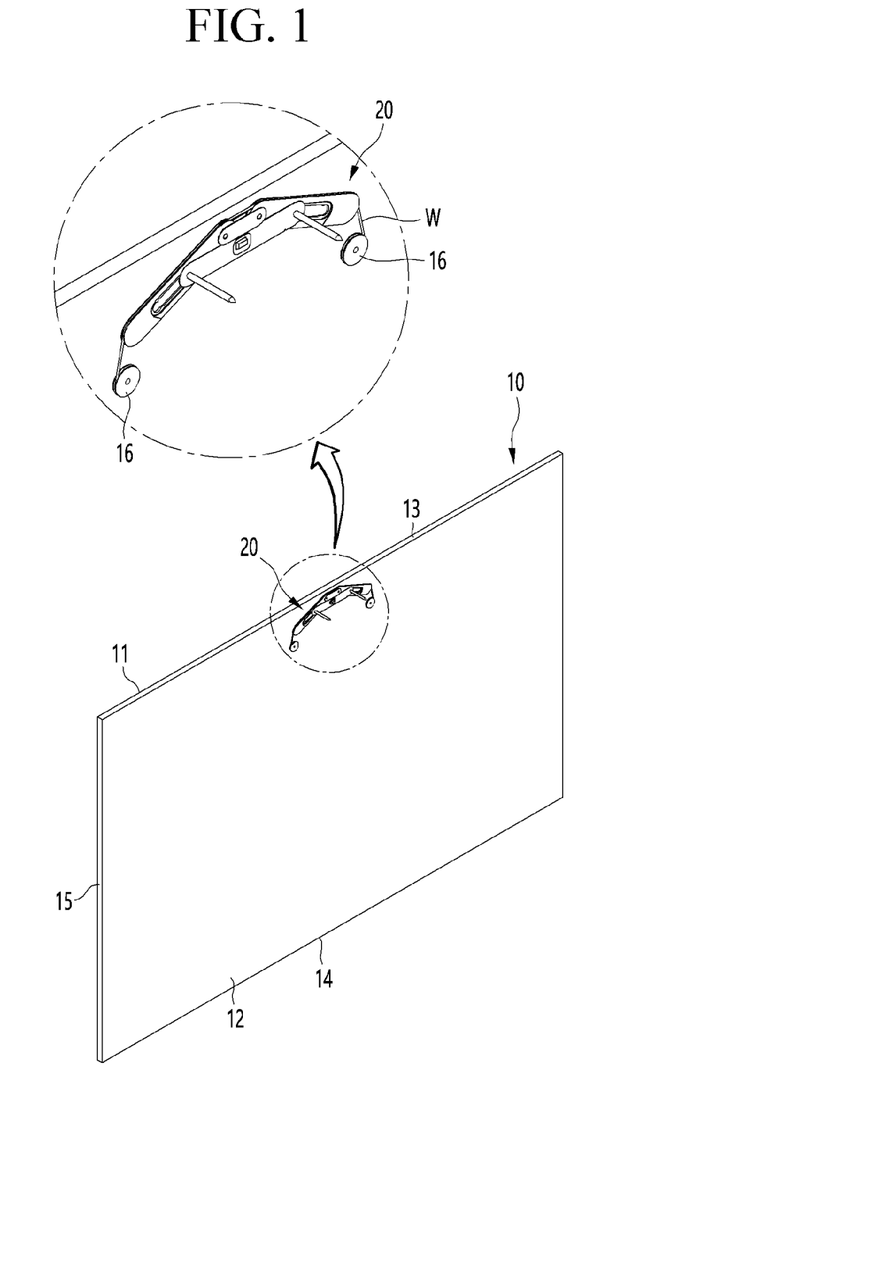
FIG. 1 is a perspective view illustrating a wall mount type display device according to an embodiment of the present disclosure.

FIG. 1 is a perspective view illustrating a wall mount type display device according to an embodiment of the present disclosure.

The wall mount type display device (hereinafter, "display device") according to the present embodiment may include a main body 10 on which a display is provided, a wire W connected to the main body 10, and a wall mount assembly 20 which is fixed to the wall and to which the wire W is hung to support the main body 10.

The wall mount assembly 20 may be preferentially fixed to the wall, and then, the wire W connected to the main body 10 may be hung to the wall mount assembly 20 which is in a state of being mounted on the wall. Accordingly, the main body 10 may be supported by hanging to the wall mount assembly 20 by the wire W.

In more detail, the main body 10 may include a front surface 11 on which a display is provided and a rear surface 12 connected to the wall mount assembly 20. The rear surface 12 may face a wall on which the display device is installed.

The circumference of the main body 10 may include a pair of long sides 13 and 14 and a pair of short sides 15. The pair of long sides 13 and 14 may include an upper side 13 and a lower side 14 of the main body 10. The pair of short sides 15 may be both lateral sides 15 of the main body 10.

Opposite ends of the wire W may be connected to the main body 10, in more detail the rear surface 12. In more detail, a pair of wire connection portions 16 to which opposite ends of the wire W are connected may be fixed to the rear surface 12 of the main body 10. The pair of wire connection portions 16 may be spaced in the left and right direction.

The wire W connected to the pair of wire connection portions 16 may be in a loose state and then may be caught by the wall mount assembly 20 and become taut.

The pair of wire connection portions 16 and the wall mount assembly 20 may be located closer to the upper side 13 of the upper side 13 and the lower side 14 of the main body 10. In addition, the pair of wire connection portions 16 and the wall mount assembly 20 may be located in a central portion of the main body 10 in the left and right direction.

The wire connection portion 16 may have an approximately disk shape. A wire groove 16a (see FIG. 2) in which the wire W is wound may be formed in an outer circumference of the wire connection portion 16. Therefore, the operator can easily adjust the length of the wire W located between the pair of wire connection portions 16 by winding or unwinding the wire W in the wire groove 16a.

Figure 2:
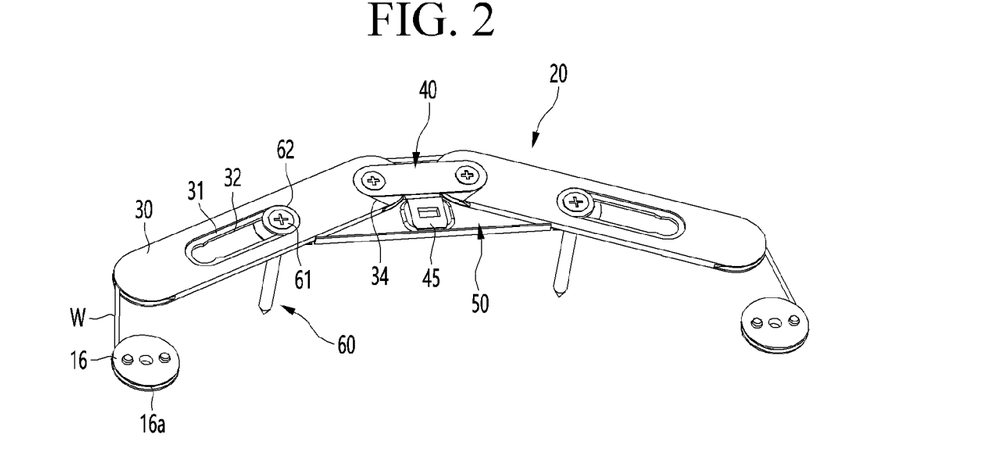
FIG. 2 is a perspective view illustrating a wall mount assembly according to an embodiment of the present disclosure.
Figure 3:
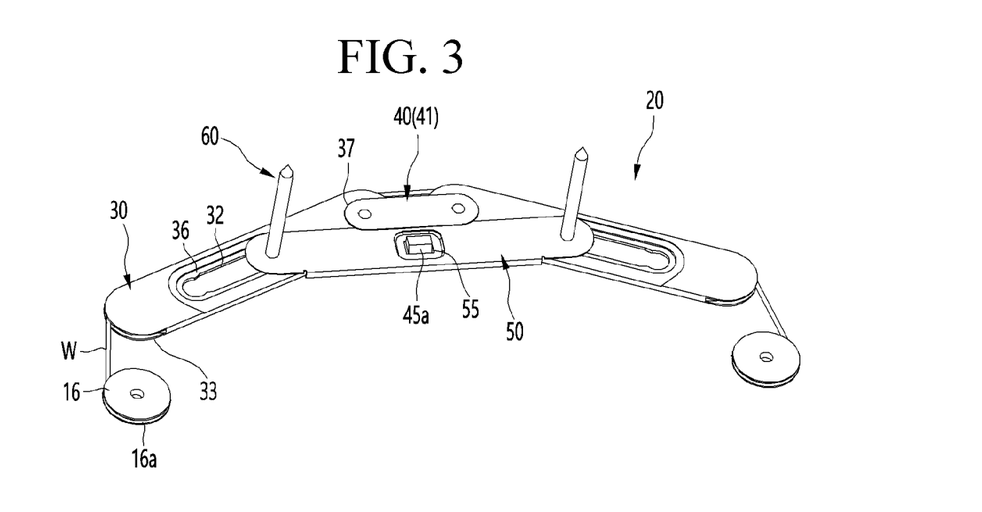
FIG. 3 is a view illustrating the wall mount assembly illustrated in FIG. 2 viewed from a different direction.
Figure 4:
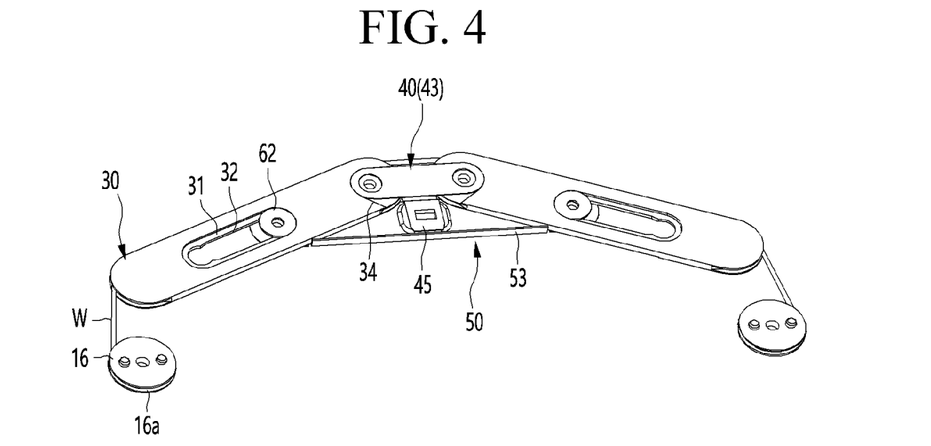
FIGS. 4 to 6 are views for explaining the configuration of a wall mount assembly according to an embodiment of the present disclosure.
Figure 5:
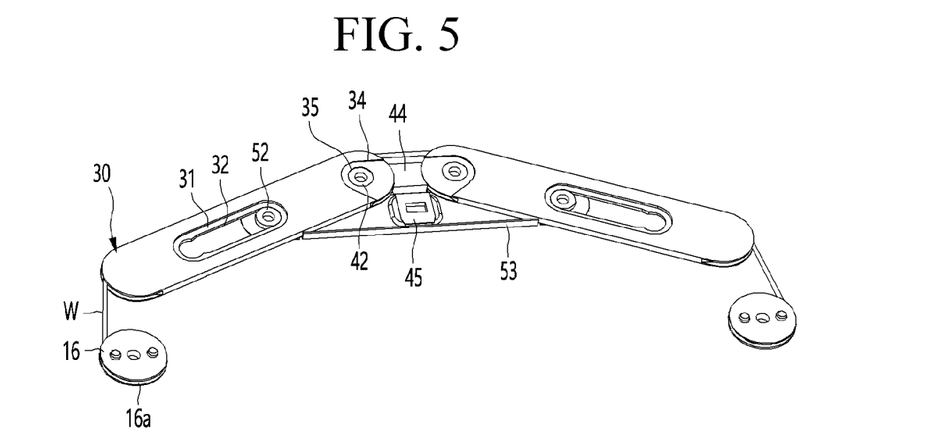
Figure 6:
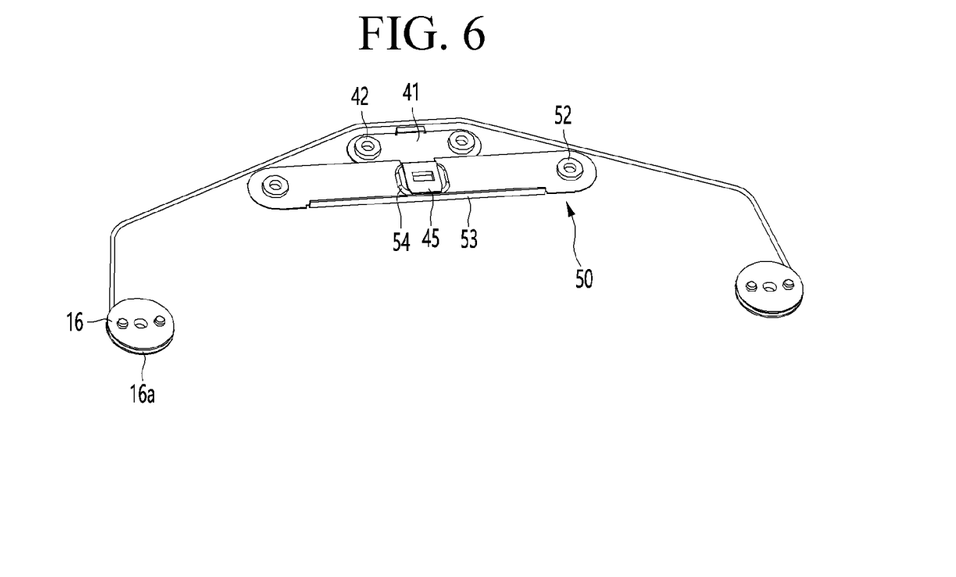

FIG. 2 is a perspective view illustrating a wall mount assembly according to an embodiment of the present disclosure, FIG. 3 is a view illustrating the wall mount assembly illustrated in FIG. 2 viewed from a different direction, and FIGS. 4 to 6 are views for explaining the configuration of a wall mount assembly according to an embodiment of the present disclosure.

In more detail, FIG. 4 is a view in which the fixing member and the fastening member illustrated in FIG. 2 are removed. FIG. 5 is a view in which the washer and the front cover illustrated in FIG. 4 are removed. FIG. 6 is a view in which a pair of supporting bars and a reinforcing body illustrated in FIG. 5 are removed.

The wall mount assembly 20 includes a pair of supporting bars 30 supporting a wire W, a first link 40 and a second link 50 connecting the pair of supporting bars 30 to each other, and a fixing member 60 for fixing the wall mount assembly 20 to the wall.

The pair of supporting bars 30 may extend in a direction closer to each other toward the upper side. In other words, the pair of supporting bars 30 may extend obliquely in opposite directions.

In addition, a pair of supporting bars 30 may be disposed to be symmetrically in the left and right direction and may be spaced apart from each other. Upper ends of the pair of supporting bars 30 may be spaced apart from each other in the left and right direction.

Each supporting bar 30 may have a plastic material, more specifically, a poly oxy methylene (POM) material. In other words, since the supporting bar 30 can be injection-molded, it is easy to manufacture.

Each of the supporting bars 30 may include a front surface facing forward, a rear surface facing a wall, and a circumferential surface connecting the front surface and the rear surface.

The wire W may be supported by contacting the circumferential surface of the supporting bar 30 from the upper side of the supporting bar 30. In more detail, a wire receiving groove 33 in which a portion of the wire W is received may be formed on the circumferential surface of the supporting bar 30. The wire receiving groove 33 may extend along the circumference of the supporting bar 30. By the wire receiving groove 33, the wire W is prevented from being separated from the wall mount assembly 20, and the main body 10 (see FIG. 1) can be stably supported.

Long holes 32 may be formed in each supporting bar 30. The long hole 32 may be formed through the supporting bar 30 back and forth. The long hole 32 may extend in the longitudinal direction of the supporting bar 30.

A protrusion 52 of the second link 50 to be described later may be inserted into the long hole 32. Accordingly, the supporting bar 30 may slide with respect to the protrusion 52 of the second link 50 along the long hole 32, and the inclination of the pair of supporting bars 30 may be varied. In other words, the long hole 32 may be a guide hole for guiding the movement trajectory of the supporting bar 30. This will be described in detail later.

In addition, a connection hole 35 may be formed in each supporting bar 30. The connection hole 35 may be formed through the supporting bar 30 back and forth. The connection hole 35 may be formed on the upper end portion of each supporting bar 30. In other words, the connection hole 35 may be formed above the long hole 32 in the longitudinal direction of the supporting bar 30.

An insertion portion 42 of the first link 40 to be described later may be inserted into the connection hole 35. Accordingly, the supporting bar 30 may be rotatably connected to the first link 40.

The first link 40 and the second link 50 may extend parallel to each other. In more detail, the first link 40 and the second link 50 may extend in a horizontal direction, more specifically in a left and right direction. Accordingly, the wall mount assembly 20 may have an approximately "A" shape.

The first link 40 may rotatably connect the upper end portions of the pair of supporting bars 30 to each other. In other words, opposite ends of the first link 40 may be rotatably connected to the upper end portion of the pair of supporting bars 30.

In more detail, the first link 40 may include a rear plate 41, an insertion portion 42, and a front cover 43. The first link 40 may further include a reinforcing body 44.

The rear plate 41 may form a rear surface of the first link 40. The rear plate 41 may include a metal material. The rear plate 41 may extend in the left and right direction.

The rear plate 41 may be located behind the pair of supporting bars 30. In more detail, the rear plate 41 may be located behind the upper end portion of the pair of supporting bars 30.

A rear stepped portion 37 on which opposite end portions of the rear plate 41 are seated may be provided on the rear surface of each supporting bar 30. The rear stepped portion 37 may be stepped forward from the rear surface of the supporting bar 30.

The rear stepped portion 37 may be formed so that the supporting bar 30 and the rear plate 41 do not interfere with each other within the movable range of the supporting bar 30.

The insertion portion 42 may protrude forward from opposite end portions of the rear plate 41. In other words, a pair of insertion portions 42 spaced in the left and right direction may be provided.

The insertion portion 42 may be inserted into the connection hole 35 of the supporting bar 30. In more detail, one insertion portion 42 may be inserted into the connection hole 35 of one supporting bar 30, and the other insertion portion 42 may be inserted into the connection hole 35 of the other supporting bar 30.

The insertion portion 42 may have a hollow cylinder shape. A female thread may be formed around the inner circumference of the insertion portion 42. Accordingly, the fastening member 70 to be described later may be fastened to the insertion portion 42.

The front cover 43 may form the front surface of the first link 40. The front cover 43 may include a metal material. The front cover 43 may extend in the left and right direction.

The front cover 43 may be located in front of the pair of supporting bars 30. In more detail, the front cover 43 may be located in front of the upper end portions of the pair of supporting bars 30.

The front cover 43 may cover the pair of insertion portions 42 from the front. The front cover 43 may be fastened to a pair of insertion portions 42. In more detail, the fastening member 70 such as a screw and a bolt may pass through the front cover 43 and be fastened to the insertion portion 42.

Front stepped portions 34 on which opposite end portions of the front cover 41 are seated may be provided on the front surface of each supporting bar 30. The front stepped portion 34 may be stepped from the front surface to the rear of the supporting bar 30.

The front stepped portion 34 may be formed so that the supporting bar 30 and the front cover 43 do not interfere with each other within the movable range of the supporting bar 30.

In other words, stepped portions 34 and 37 which is stepped with respect to the outer surface and on which the front cover 43 or the rear plate 41 is seated may be formed on the supporting bar 30.

The reinforcing body 44 may reinforce the strength of the first link 40. The reinforcing body 44 may have a plastic material, more specifically, a poly oxy methylene (POM) material. In other words, the material of the reinforcing body 44 may be different from the material (metal) of the rear plate 41 and the front cover 43.

The reinforcing body 44 may be located between the upper end portions of the pair of supporting bars 30. The reinforcing body 44 may be in contact with the circumferential surfaces of the pair of supporting bars 30.

Further, the reinforcing body 44 may be disposed in front of the rear plate 41 and the front cover 43 may cover the reinforcing body 44. In other words, the reinforcing body 44 may be located between the rear plate 41 and the front cover 43 in the front and rear direction.

Meanwhile, the second link 50 may be located below the first link 40. The second link 50 may include a metal material.

The second link 50 may be located behind the pair of supporting bars 30.

A lower stepped portion 36 on which opposite end portions of the second link 50 are seated may be provided on the rear surface of each supporting bar 30. The lower stepped portion 36 may be formed to be stepped forward from the rear surface of the supporting bar 30. The lower stepped portion 36 may communicate with the rear stepped portion 37 described above.

The lower stepped portion 36 may be formed so that the supporting bar 30 and the second link 50 do not interfere with each other within the movable range of the supporting bar 30.

Opposite end portions of the second link 50 may be connected to the long hole 32 formed in the supporting bar 30. In more detail, protrusions 52 inserted into long holes 32 may be provided at opposite end portions of the second link 50. The protrusions 52 may protrude forward from opposite end portions of the second link 52. The protrusion 52 may have a hollow cylinder shape.

A pair of protrusions 52 which are spaced apart in the longitudinal direction of the second link 52 may be provided. One protrusion 52 may be inserted into the long hole 32 of one supporting bar 30, and the other protrusion 52 may be inserted into the long hole 32 of the other supporting bar 30.

In addition, a reinforcing rib 53 may be formed on the second link 50. The reinforcing rib 53 may be bent forward from the lower end of the second link 50. The reinforcing rib 53 may extend in the longitudinal direction of the second link 50. The reinforcing rib 53 may be located between the pair of supporting bars 30.

Meanwhile, the fixing member 60 may be a nail or a screw and may fix the second link 50 to the wall. In more detail, the fixing member 60 may pass through the protrusion 52 of the second link 50 and be fixed to the wall.

A pair of fixing members 60 which passes through the pair of protrusions 52 and is fixed to the wall may be provided.

The head portion 61 of the fixing member 60 may be located in front of the protrusion portion 52. A washer 62 may be provided between the protrusion portion 52 and the head portion 61 of the fixing member 60.

The washer 62 may prevent the supporting bar 30 from being separated from the second link 50 and may facilitate the sliding operation of the supporting bar 30.

A stepped recess 31 in which the washer 62 is located may be formed on the front surface of each supporting bar 30. The stepped recess 31 may be formed to be stepped from the front surface to the rear of the supporting bar 30.

The long hole 32 may be formed through the inside of the stepped recess 31. The stepped recess 31 may have a shape corresponding to the long hole 32. The size of the stepped recess 31 may be larger than the size of the long hole 32.

Meanwhile, the wall mount assembly 20 may further include a latch 45 and a latch hole 55 into which the latch 45 is inserted.

The latch 45 may be connected to any one of the first link 40 and the second link 50, and the latch hole 55 may be formed on the other one of the first link 40 and the second link 50. Hereinafter, a case where the latch 45 is connected to the first link 40 and the latch hole 55 is formed on the second link 50 will be described as an example.

The latch 45 may be connected to the lower edge of the first link 40. In more detail, the latch 45 may be hinged to the lower edge of the rear plate 41 of the first link 40. Accordingly, the latch 45 may be connected to rotatable back and forth with respect to the first link 40. The latch 45 may be fitted into the latch hole 55 in front of the latch hole 55.

The latch 45 may be connected to the central portion of the first link 40. The latch 45 may be located between a pair of supporting bars 30. The latch 45 may have a locking portion 45a protruding rearwardly and selectively engaging the latch hole 55.

The latch hole 55 may be formed to penetrate back and forth through the second link 50. The latch hole 55 may be located at the central portion of the second link 50 with respect to the longitudinal direction of the second link 50.

In more detail, the second link 50 may have a protrusion 54 protruding convexly forward, and a latch hole 55 may be formed on the protrusion 54. Therefore, since the latch hole 55 is located in front of the front surface of the second link 50, the latch 45 can be more easily fitted into the latch hole 55.

The first link 40 and the second link 50 may be coupled to each other by the latch 45 and the latch hole 55, and it is possible to prevent the pair of supporting bars 30 from sliding unintentionally.

Figure 7:
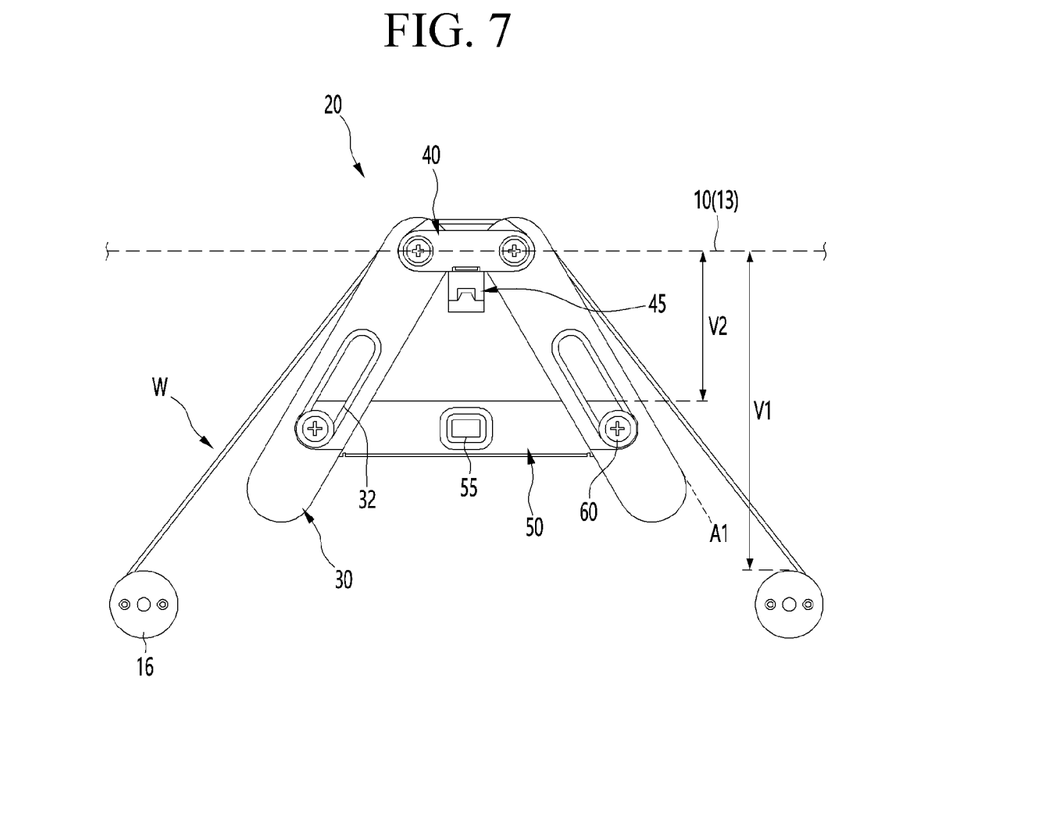
FIGS. 7 and 8 are views for explaining the operation of the wall mount assembly according to an embodiment of the present disclosure.
Figure 8:
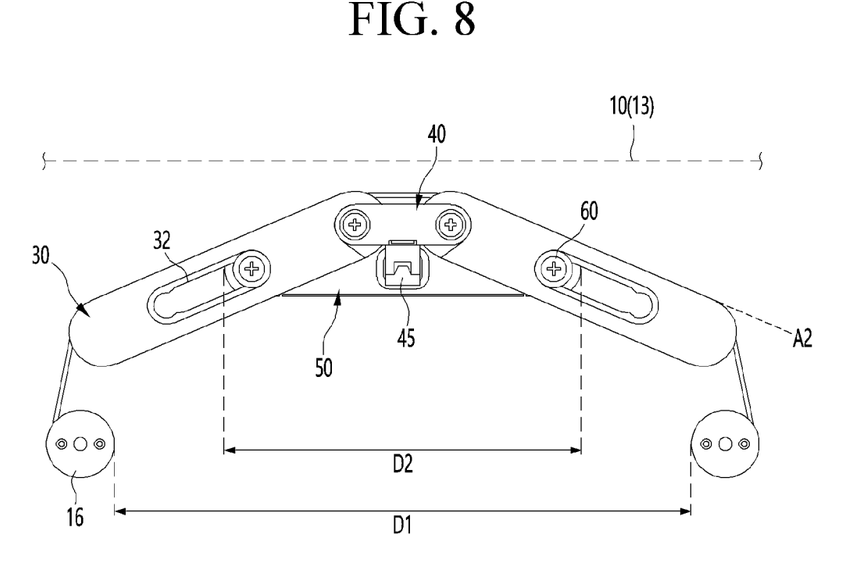

FIGS. 7 and 8 are views for explaining the operation of the wall mount assembly according to an embodiment of the present disclosure.

The inclination of the pair of supporting bars 30 may be varied between a first inclination A1 in which the upper end portion of the supporting bar 30 protrudes upward of the main body 10 and a second inclination A2 in which the upper end portion of the supporting bar 30 is located at the rear of the main body 10.

The second inclination A2 may be gentler than the first inclination A1.

If the inclination of the pair of supporting bars 30 is the first inclination A1, the width of the wall mount assembly 20 in the left and right direction may be narrowed and the wall mount assembly 20 may be in a state of rising upward.

Accordingly, the operator can easily mount the wire W connected to the main body 10 on the wall mount assembly 20.

If the inclination of the pair of supporting bars 30 is the second inclination A1, the width of the wall mount assembly 20 in the left and right direction may be wider and the height thereof may be gentle. Therefore, the wall mount assembly 20 can stably support the wire W connected to the main body 10.

In more detail, the operator may mount the wire W on the wall mount assembly 20 in a state where the inclination of the pair of supporting bars 30 is the first inclination A1. Since the upper end portions of the pair of supporting bars 30 protrude upward of the main body 10, the operator can perform the mounting operation while visually checking the upper end portions of the supporting bars 30. Therefore, it is possible to facilitate the mounting work of the operator.

After the wire W is mounted on the wall mount assembly 20, the operator may apply an external force to the wall mount assembly 20 so that the inclination of the pair of supporting bars 30 becomes the second inclination A2. Alternatively, even if the operator does not apply an external force, the inclination of the pair of supporting bars 30 may move to the second inclination A2 by the load of the main body 10.

If the inclination of the pair of supporting bars 30 is the second inclination A2, the upper end portion of the supporting bar 30 may be located at the rear of the main body 10. In other words, the entire wall mount assembly 20 is located at the rear of the main body 10 and may be covered by the main body 10 with respect to the front. Accordingly, the outer appearance design of the display device can be improved.

If the inclination of the pair of supporting bars 30 is the first inclination A1, the protrusion 52 (see FIG. 5) of the second link 50 may be located at the lower end of the long hole 32. If the inclination of the pair of supporting bars 30 is the second inclination A1, the protrusion 52 of the second link 50 may be located at the upper end of the long hole 32.

In addition, if the inclination of the pair of supporting bars 30 is the first inclination A1, the first link 40 may be spaced above the upper side of the second link 50. When the inclination of the pair of supporting bars 30 is the second inclination A2, the first link 40 may be adjacent to or in contact with the second link 50.

In addition, when the inclination of the pair of supporting bars 30 is the first inclination A1, the wire W may be supported by contacting the upper end portions of the pair of supporting bars 30. On the other hand, when the inclination of the pair of supporting bars 30 is the second inclination A2, the wire W may be received and supported in the wire receiving groove 33 (see FIG. 2) formed in the pair of supporting bars 30.

In other words, when the inclination of the pair of supporting bars 30 is changed from the first inclination A1 to the second inclination A2, the contact length with the wire W1 to the pair of supporting bars 30 increases, and the wall mount assembly 20 may support the wire W and the main body 10 more stably.

In addition, the latch 45 may be fitted into the latch hole 55 when the inclination of the pair of supporting bars 30 is the second inclination A2. Accordingly, it is possible to prevent the inclination of the pair of supporting bars 30, which is the second inclination A2, from being restored to the first inclination A1.

Meanwhile, in a state where the main body 10 and the wire W are mounted on the wall mount assembly 20, the vertical distance V1 between the upper end of the main body 10 and the wire connection portion 16 is may be longer than the vertical distance V2 between the upper end of the main body 10 and the second link 50. In other words, the wire connection portion 16 may be located at a lower height than the second link 50. In addition, the distance D1 between the pair of wire connection portions 16 may be longer than the length D2 of the second link 50.

Since the pair of wire connection portions 16 are fixed to the rear surface of the main body 10 and the second link 50 is fixed to the wall, the positional relationship can be maintained regardless of the inclination of the pair of supporting bars 30.

As a result, the main body 10 may be stably supported by the wire W mounted on the wall mount assembly 20.

According to a preferred embodiment of the present disclosure, the pair of supporting bars included in the wall-mounting assembly may slide with respect to the protrusion along the long hole and the inclination thereof may be varied. Accordingly, the operator can easily mount the wire on the wall-mounting assembly in a state where the width thereof in the left and right direction is narrowed and the wall-mounting assembly rises upwards. Thereafter, the wall-mounting assembly has a wider width in the left and right direction and a gentle height, so that the wire and the main body can be stably supported.

In addition, when the inclination of the pair of supporting bars is a first inclination since the upper end portions of the pair of supporting bars are in a state of protruding upward of the main body, the operator can perform the mounting operation while visually checking the upper end portion of the supporting bar. Therefore, it is possible to further facilitate the mounting operation by the operator.

In addition, if the inclination of the pair of supporting bars is a second inclination, the entire wall-mounting assembly is located at the rear of the main body and can be covered by the main body from the front. Accordingly, an outer appearance design of the display device can be improved.

In addition, since the latch is inserted into the latch hole, it is possible to prevent the inclination of the pair of supporting bars from being restored from the second inclination to the first inclination.

In addition, the wire may be received and supported in the wire receiving groove formed on a circumferential surface of each supporting bar. Thereby, the wire is prevented from detaching from the wall mount assembly, and the main body can be stably supported.

In addition, the operator can easily adjust the length of the wire located between the pair of wire connection portions by winding or unwinding the wire in the wire groove formed in the wire connection portion.

The above description is merely illustrative of the technical idea of the present disclosure, and a person skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments.

The scope of protection of the present disclosure should be interpreted by the following claims, and all technical ideas within the scope equivalent thereto should be construed as being included in the scope of the present disclosure.

What is claimed is:

1. A wall mount type display device comprising:
a main body on which a display is provided;
a wire having opposite ends connected to the main body; and
a wall mount assembly which is fixed to a wall and to which the wire is hung to support the main body,
wherein the wall mount assembly includes
a pair of supporting bars which support the wire and extend in a direction closer to each other toward an upper side,
a first link rotatably connecting upper end portions of the pair of supporting bars to each other,
a pair of long holes formed through the pair of supporting bars and extending in a longitudinal direction of the pair of supporting bars,
a second link located at a height lower than the first link,
a pair of protrusions protruding from opposite ends of the second link and inserted into the pair of long holes, and
a pair of fixing members fixed to the wall through the pair of protrusions, and
wherein the pair of supporting bars slide with respect to the pair of protrusions along the pair of long holes and have a variable inclinations.

2. The wall mount type display device of claim 1,
wherein the variable inclinations of the pair of supporting bars are varied between a first inclination in which the upper end portions of the pair of supporting bars protrude upward of the main body and a second inclination in which the upper end portion of the portions of the pair of supporting bars are located at a rear of the main body.

3. The wall mount type display device of claim 2,
wherein, based on the variable inclinations of the pair of supporting bars being the first inclination, the first link is spaced above the second link, and
wherein, based on the variable inclinations of the pair of supporting bars being the second inclination, the first link is adjacent to or in contact with the second link.

4. The wall mount type display device of claim 2, further comprising:
a latch which is connected to any one of the first link and the second link; and
a latch hole which is formed on the other one of the first link and the second link, and into which the latch is fitted when the inclination of the pair of supporting bars is the second inclination.

5. The wall mount type display device of claim 1,
wherein, on circumferential surfaces of the pair of supporting bars, wire receiving grooves, in which the wire is received and which extend along the circumferential surfaces of the pair of supporting bars, are formed.

6. The wall mount type display device of claim 1, further comprising:
a pair of washers located between head portions of the pair of fixing members and the pair of protrusions,
wherein a pair of stepped recesses in which the pair of washers are located is formed on front surfaces of the pair of supporting bars, and
wherein the pair of long holes are formed through insides of the pair of stepped recesses.

7. The wall mount type display device of claim 1,
wherein a pair of connection holes, through which opposite end portions of the first link are rotatably connected, are formed on upper end portions of the pair of supporting bars.

8. The wall mount type display device of claim 7,
wherein the first link includes
   a rear plate located a rear of the pair of supporting bars,
   an insertion portions protruding forward from opposite end portions of the rear plate and inserted into the connection holes, and
   a front cover located in front of the pair of supporting bars and fastened to the insertion portion.

9. The wall mount type display device of claim 8,
wherein a stepped portion which is stepped with respect to an outer surface and on which the front cover or the rear plate is seated is formed on the pair of supporting bars.

10. The wall mount type display device of claim 8,
wherein the first link further includes
   a reinforcing body located between the upper end portions of the pair of supporting bars and located between the rear plate and the front cover.

11. The wall mount type display device of claim 1, further comprising:
   a pair of wire connection portions which are fixed to a rear surface of the main body and on which a wire groove around which the wire is wound is formed around an outer circumference thereof.

12. The wall mount type display device of claim 11,
wherein a vertical distance between an upper end of the main body and the wire connection portion is greater than a vertical distance between an upper end of the main body and the second link.

13. The wall mount type display device of claim 11,
wherein a distance between the pair of wire connection portions is longer than a length of the second link.

* * * * *